Figure 1:
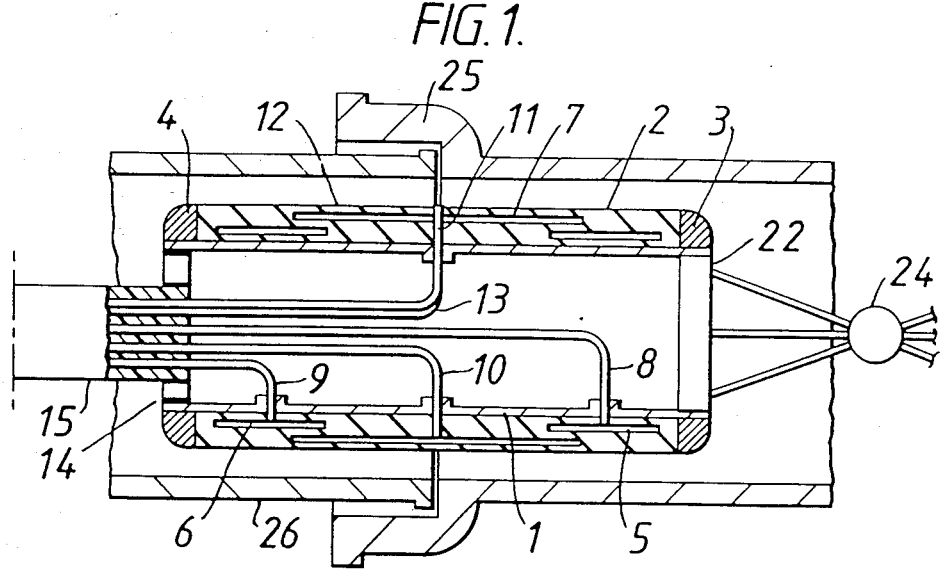

United States Patent

Parkes et al.

[11] Patent Number: 4,627,471
[45] Date of Patent: Dec. 9, 1986

[54] SEALING JOINTS AND LEAKS

[75] Inventors: Adrian S. Parkes, Burgess Hill; Gordon J. Corbett, Croydon; Peter S. Clough, Manchester; Colin N. H. Barker, Stockport, all of England

[73] Assignee: British Gas Corporation, United Kingdom

[21] Appl. No.: 715,453

[22] Filed: Mar. 25, 1985

Related U.S. Application Data

[62] Division of Ser. No. 612,842, May 22, 1984.

[30] Foreign Application Priority Data

May 23, 1983 [GB] United Kingdom ............ 83 14209

[51] Int. Cl.⁴ ............................................. F16L 55/18
[52] U.S. Cl. ........................................ 138/97; 285/21
[58] Field of Search ............... 138/97, 93; 73/40.5 R; 401/139, 263, 266; 285/21

[56] References Cited

U.S. PATENT DOCUMENTS

| | | | |
|---|---|---|---|
| 3,168,908 | 2/1965 | Zurbrigen et al. | 138/97 |
| 3,834,422 | 9/1974 | Larson | 138/93 X |
| 3,894,131 | 7/1975 | Speech | 264/45.2 |
| 4,067,349 | 1/1978 | Austin et al. | 73/40.5 R X |
| 4,529,008 | 7/1985 | Appleton | 138/97 |

FOREIGN PATENT DOCUMENTS 212715 3/1924 United Kingdom ............ 138/93

Primary Examiner—Stephen Marcus
Assistant Examiner—Mark Thronson
Attorney, Agent, or Firm—Larson & Taylor

[57] ABSTRACT

Joints and leaks in pipelines or mains are sealed by injecting into the joint or leak a sealant by means of an expandible tubular pig which is moved endwise through the pipeline or main. The sealant is in the form of an anaerobically curable monomer which cures in the relatively air free conditions in the joint or leak. The pig forms within the pipeline or main an air-free space which communicates with the joint or leak and which is isolated from the fluid in the main. Nevertheless the pig is hollow to permit the flow of fluid therethrough while the joint or leak is sealed. The sealant is injected into the joint or leak by way of the space so that the sealant cures in situ in the joint or leak.

2 Claims, 19 Drawing Figures

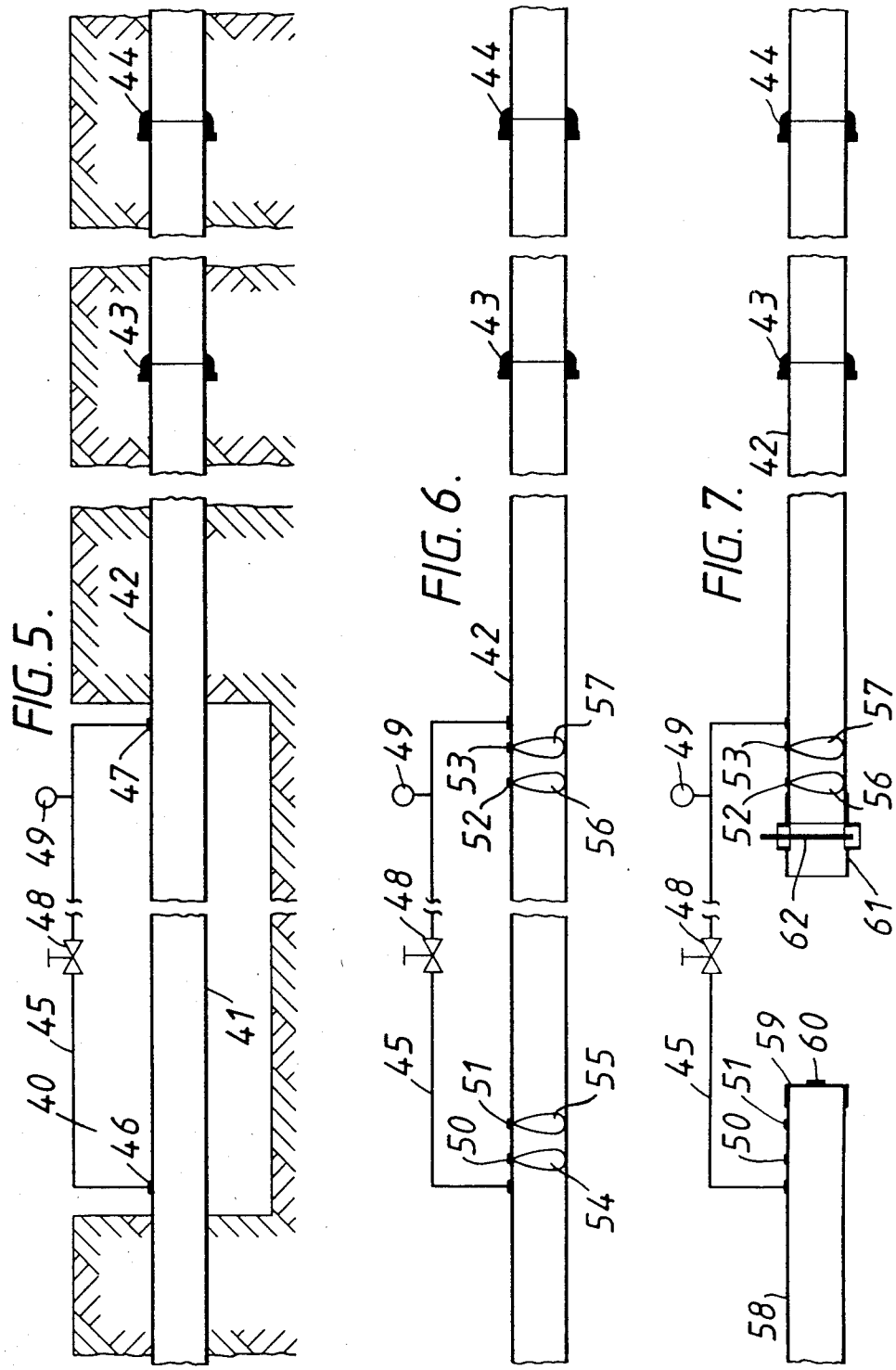

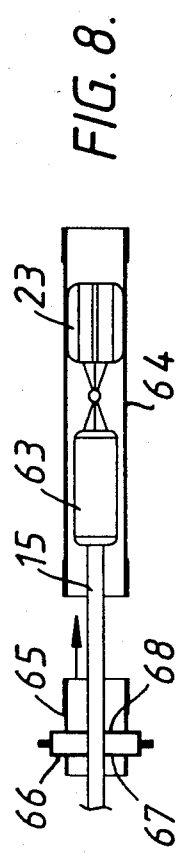
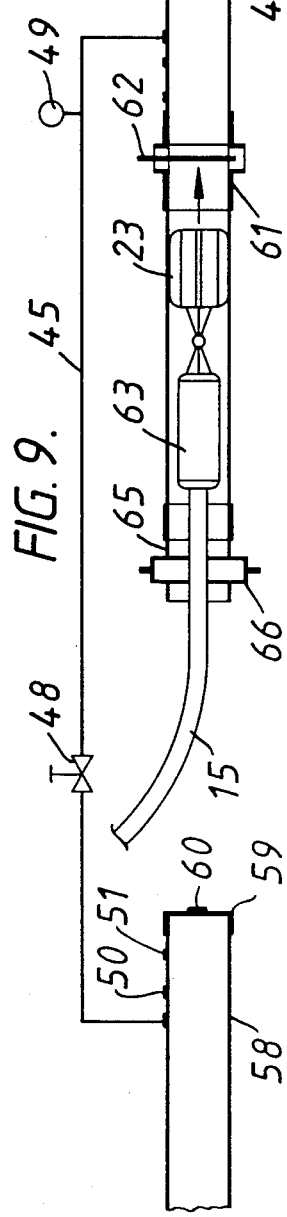
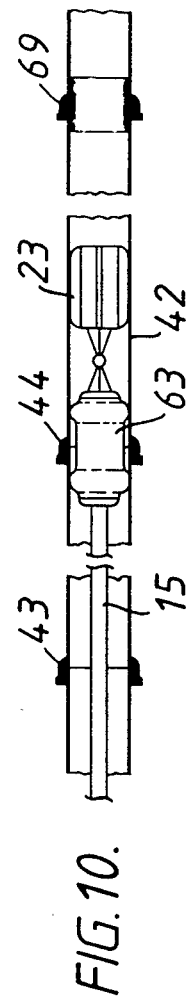
FIG. 8.
FIG. 9.
FIG. 10.

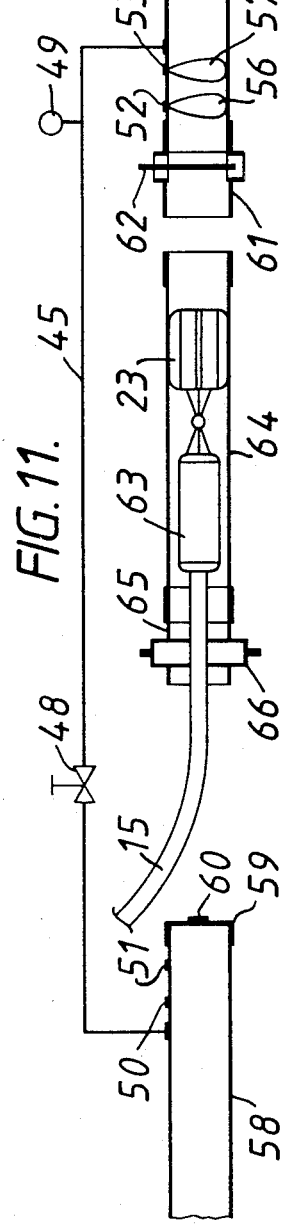
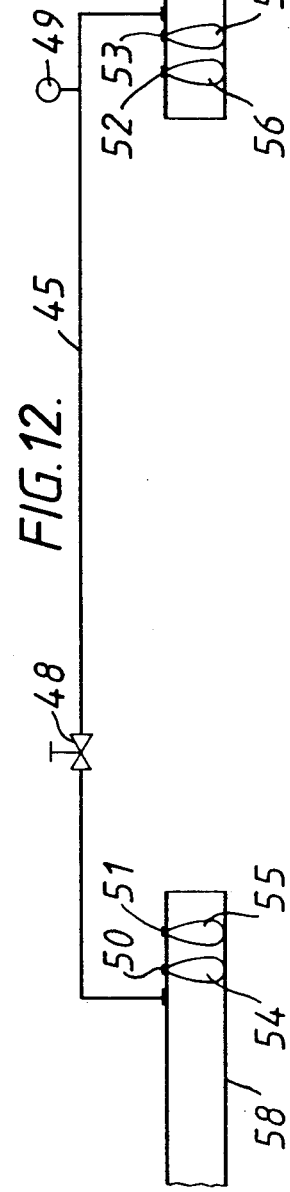
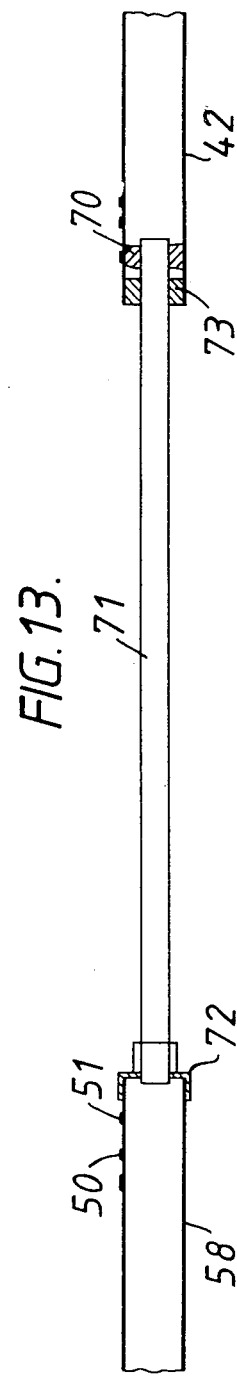

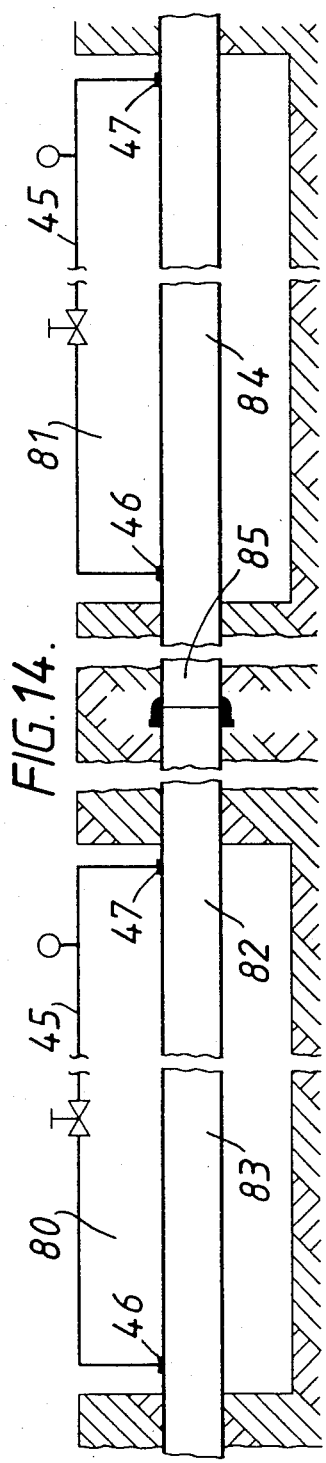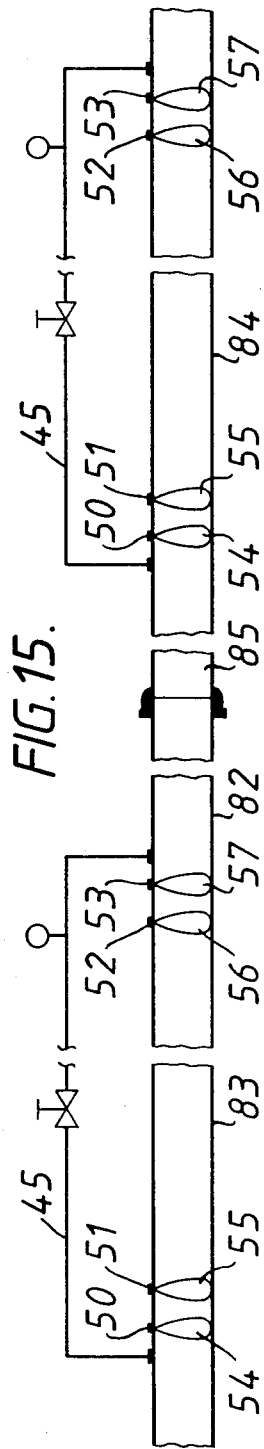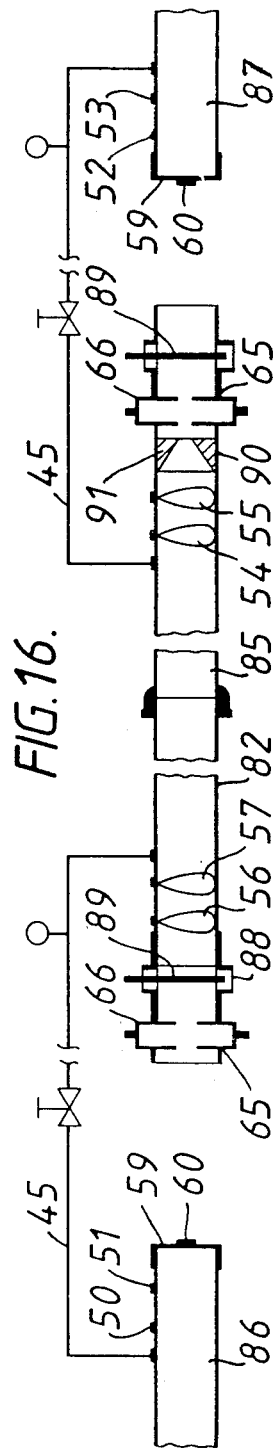

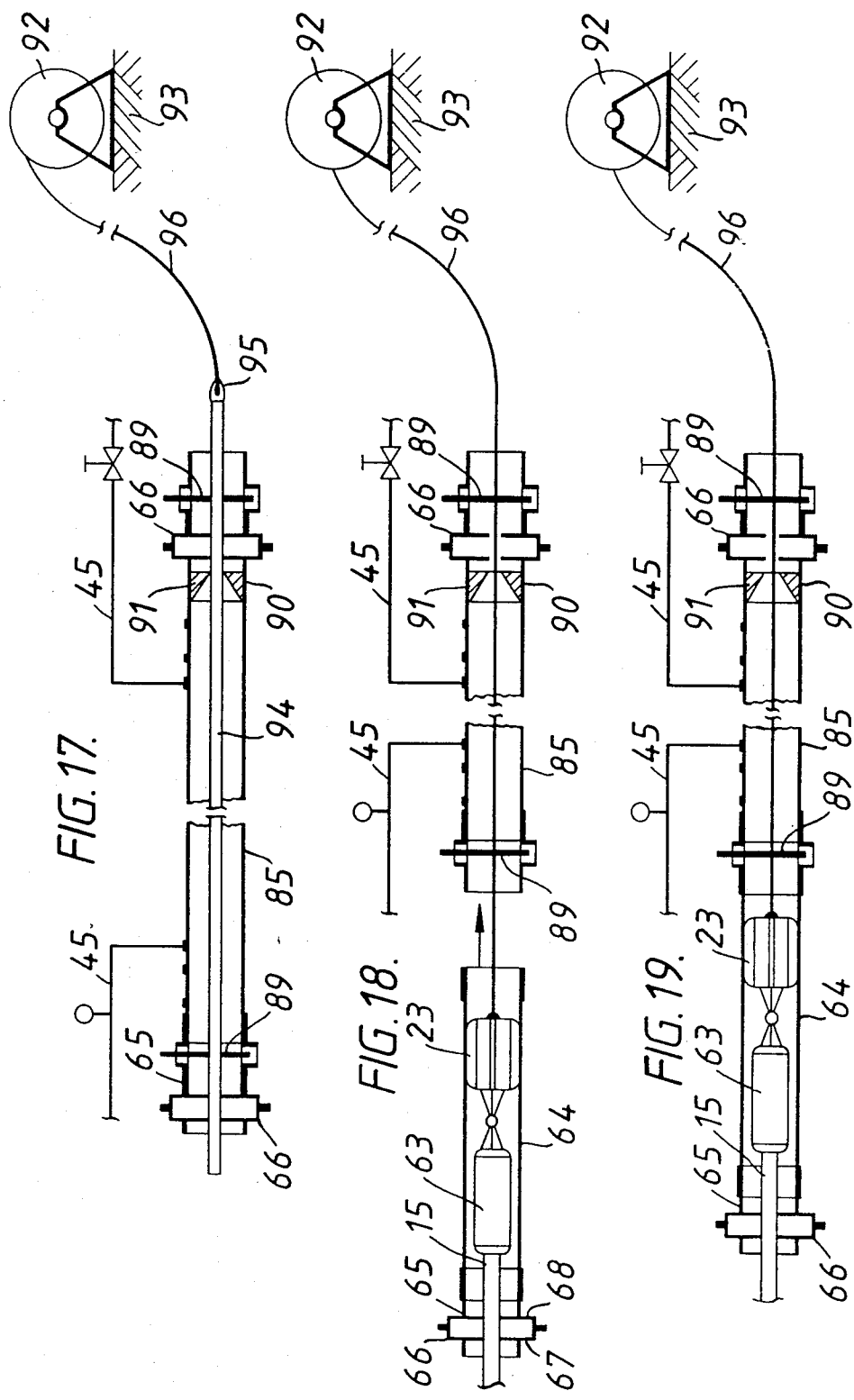

SEALING JOINTS AND LEAKS

This is a division of application Ser. No. 612,842 filed May 22, 1984.

This invention relates to the sealing of joints, or leaks in pipelines or mains particularly those which are "live", that is, are carrying fluids such as gas, water or sewage although the invention is particularly concerned with the sealing of joints or leaks in gas pipelines or mains.

A substantial problem has arisen in the gas and gas transportation industry consequent upon the replacement of coal gas as a source of domestic and industrial fuel, by natural gas. Traditionally and for many generations coal gas has been fed to customers by underground gas pipes and mains, usually of cast iron, many of which have been in service for decades. In most cases such pipes were laid underground and joined together by lap joints packed with hemp and sealed with a lead seal. Although the lead was intended as the primary seal between the lapped pipe ends and the hemp merely a packing to prevent molten lead flowing into the interior of the pipe during the jointing process, in a large proportion of cases the lead seal was incomplete, due, for example, to contraction of the lead, or subsequent pipe movement which broke the seal. In practice it has been the hemp which provided the seal, and a contributing factor to the effectiveness of the hemp packing as the seal has been the relatively high moisture content of the previously used coal or town gas. The hemp packing absorbs this moisture and swells to provide a gas-tight seal between the lapped pipe ends. Also over a period of time tarry deposits build up in and around the joint, further contributing to the effectiveness of the seal. With the advent of the much drier natural gas, however, the hemp packing in the old gas mains has dried out, and contracted so that the seal has broken down and major leaks have developed. Inasmuch that many of the joints in existing pipelines are now virtually inaccessible e.g. buried under roads, buildings etc., such leakages cause immense problems, and even where the pipelines are more readily accessible e.g. in open country or at the roadside, the repair of such leaks is costly due to the labour involved in digging down to the pipeline and exposing the offending joint.

Not only are leaking joints a problem, but so are pipe fractures caused in other ways, for example, by corrosion or land subsidence, or merely by overstressing of the pipe by heavy vehicles driving over the buried pipe, and these fractures can be equally difficult and costly to repair from the outside.

Techniques are available for sealing joints and leaks in underground pipelines and mains by the injection of a sealant composition into the joint or leak from the inside of the pipe or main, this being so called "internal sealing".

These techniques involve the use of a so-called pig or packer as the sealant injection device. Generally the pig is drawn or otherwise moved through the main or pipeline to the location of the joint or leak and a sealant composition is fed to the pig by appropriate feed line or feed-lines which trail behind the pig as it is drawn or moved through the main or pipeline and extend back to the point at which the pig is introduced into the main or pipeline. This can either be a permanent access point or a temporary access point exposed for the purpose, for example, by excavation at a more appropriate location than that at which the joint (leaking or otherwise) or the leak (caused by for example a fracture) is located. Once the pig is at the site of the fracture, the sealant can be injected into the joint or leak, as the case may be, to seal the joint or leak.

UK Patent Specification No. 965132 (Cement Linings Pty Ltd) discloses a technique for sealing in-situ cracks and breaks in a pipeline such as a sewer or water main. The technique involves the use of an elongated tubular pig having two separate expansible compartments at each end and a central section that is also expansible. In use the pig is moved along the main to the desired location and the central compartment is inflated against the joint or leak. Next the two end compartments are inflated and the central compartment is deflated or slightly deflated to form an annular channel into which sealant can be fed and applied as an annular bead against the wall of the main. If desired the central section can be reinflated to apply pressure to assist penetration of the sealant into the joint or fracture. After sealing, the pig can be deflated and moved to a new position in the main, or withdrawn, as the case may be.

UK Patent Specification No. 1328886 (British Gas Corporation) discloses a technique for sealing joints in pipelines particularly gas mains. The technique involves the use of an elongated tubular pig having two inflatable end sections or seals which are spaced from each other by a central non-inflatable region. In use a ground region is excavated to expose part of the main. This is isolated from the adjoining portions of the main and a by-pass is connected at both ends of the isolated section. The isolated section is removed and a pig-trap in which the pig is located is inserted and sealed in place of this section. The pig is then advanced up one portion of the main until a first joint is detected by an electromagnetic sensor disposed at the front of the pig. The pig is then moved a further distance until the central non-inflatable region lies opposite the joint. The two seals are then inflated so that they form tight seals against the inner wall of the main, one on each side of the joint. Sealant is then injected under pressure by way of a trailing tube into the annular clearance formed between the seals, the central region of the pig and the wall of the main so that the sealant enters the joint to seal it. After sealing the seals are deflated and the pig is advanced to the next joint which is sealed and so on. After all the joints, or as many as necessary, have been sealed the pig can be withdrawn. The pig can be turned round and advanced up the other portion of the main to seal the joints in this portion in a similar manner.

One problem with the technique disclosed in UK Patent Specification No. 965132 is that during the period of repair of the main the flow of water along the main is cut off for the period during which the crack is repaired.

This may be acceptable in the repair of water or sewage mains but it is very undesirable in the repair of gas mains since gas consumers would be cut off temporarily.

This problem is overcome in UK Patent Specification No. 1352886 since the pig is designed to permit gas in the main to flow through the pig when in position in the main so that the main is live at all times. However, because of the design of the pig in 1352886 there is a tendency for gas to become trapped by the sealant at the joint leading to poor bonding between the sealant and the inner wall of the gas main. It is therefore an object of the present invention to overcome the problems described above.

According therefore to one aspect of the present invention a method is provided for sealing a joint or leak in a fluid-transporting pipeline or main, the method comprising isolating from the fluid which flows along the pipeline or main a space which is substantially free of the fluid and which communicates with the joint or leak while allowing the fluid to continue to flow inside the pipeline or main past the joint or leak and injecting into the joint or leak a sealant by way of the space to seal the joint or leak as the case may be.

The creation of a fluid-free space restricts the formation of pockets of fluid in the sealant when the sealant is injected into the joint or leak with a consequent enhancement of the bonding between the sealant and the wall of the pipeline or main.

The sealant may comprise any suitable sealant such as a chemical composition of two or more monomers which are mixed and react to form a polymer. Preferably however the sealant comprises an anaerobically curable chemical composition which is allowed or caused to cure in situ in the joint or leak as the case may be.

Such compositions polymerise in the absence of air or oxygen so in this case the isolated space should preferably be air-free. It is also preferred to use a one-component monomer of the anaerobically curable kind to avoid the mixing problems which occur with compositions formed of two or more monomers.

According to another aspect of the present invention, apparatus is provided for sealing a joint or leak in a fluid-transporting pipeline or main, the apparatus comprising a tubular pig for endwise movement through the pipeline or main, the pig being adapted to permit fluid to flow therethrough and having means for isolating from the fluid flowing through the pipeline or main a space which is substantially free of the fluid and which communicates with the joint or leak together with means for injecting a sealant into the joint or leak by way of the space to seal the joint or leak as the case may be.

According to a yet further aspect of the present invention, we provide a tubular pig for sealing a joint or leak in a fluid-transporting pipeline or main, the pig being of the kind which is movable endwise through the pipeline or main and comprises three axially adjoining inflatable compartments, the central one of which is, in use, located opposite the joint or leak to be sealed and is inflated against the joint or leak before the two adjoining end compartments are inflated against the wall of the pipeline or main, the central compartment then being deflated or partially deflated so that an annular fluid-free space is formed between the joint or leak, the inflated end compartments and the deflated or partially deflated central compartment together with a feed line terminating in an outlet in the outer surface bounding the central compartment for supplying sealant to the space, the pig having a hollow central section to permit the fluid to continue to flow inside the pipeline or main past the joint or leak.

Preferably the compartments are formed in a flexible sleeve which is secured to a hollow central pig body.

Suitably the feedlines for supplying inflation fluid to the sleeve terminate in outlets in the compartments.

The sealant feedline may be connected to a reservoir for supply of the sealant and the sealant return-line may be connected between the reservoir and the outer surface of the sleeve to return unused sealant to the reservoir.

Preferably a device for sensing the position of the joint or leak is connected to the pig so that tht pig can be moved to the position where its central compartment is opposite to the joint or leak.

Figure 2:
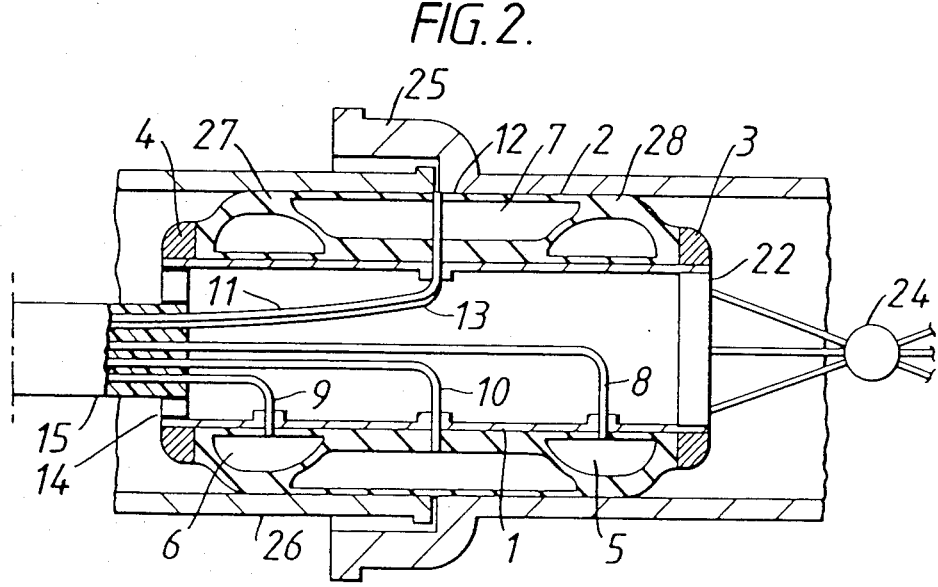
Figure 3:
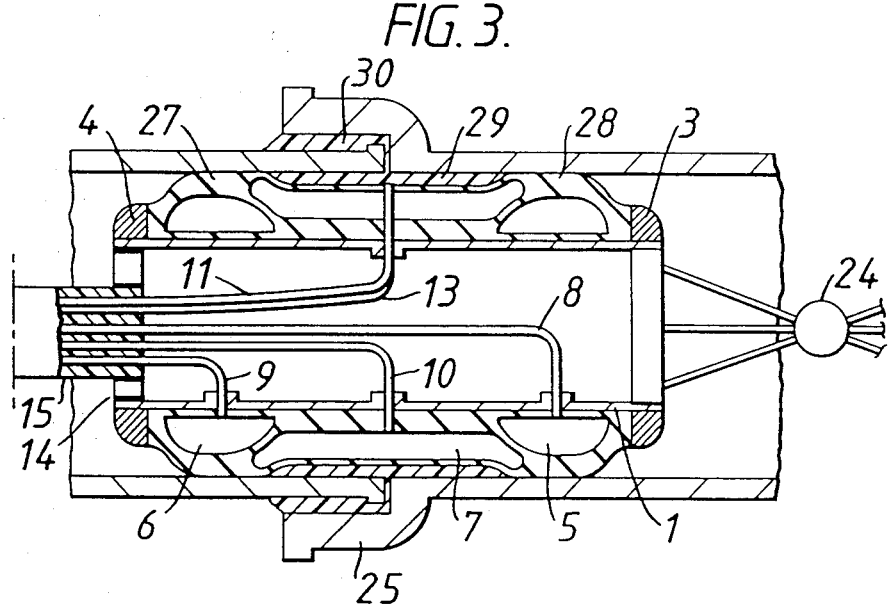

Embodiments of the invention will now be particularly described with reference to the accompanying drawings in which FIG. 1 shows a sectioned side view of an expandible tubular pig in situ in a gas main in the unexpanded condition, FIG. 2 is a view similar to FIG. 1 showing the pig in the fully expanded condition, FIG. 3 is a view similar to FIG. 3 showing the central compartment of the pig slightly deflated.

Figure 4:
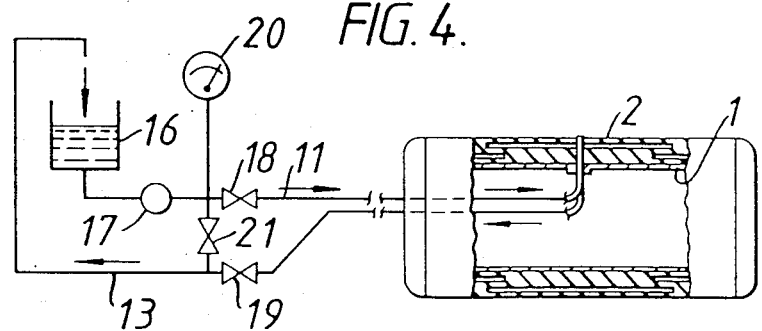

FIG. 4 shows in schematic form the reservoir and pumping system for supplying sealant to, and returning excess sealant from the pig, FIGS. 5 to 13 illustrate schematically the steps involved in sealing one or more joints in a gas main using one type of technique, FIGS. 14 to 19 illustrate schematically the steps involved in sealing several joints in a gas main using another type of technique.

Referring to FIGS. 1 to 3, the pig comprises a hollow steel central tube 1 circumventing which is an expandable sleeve 2 of rubber, elastomer or other suitable flexible material.

The sleeve 2 is secured at each end to a pair of steel clamping rings 3, 4 which are welded or otherwise secured to the periphery of the tube 1.

The sleeve 2 is provided with three annular adjoining compartments 5, 6, 7, there being two identical end compartments 5 and 6 and a central compartment 7 which is radially more distant from the tube 1 than the other compartments 5 and 6, the central compartment 7 slightly overlapping the other compartments 5 and 6.

Nitrogen gas feed lines 8, 9, and 10 extend through the tube 1 and terminate in outlets in each of the compartments 5, 6, and 7, said feed lines supplying nitrogen from a suitable source, e.g. a cylinder to inflate the compartments as required.

A sealant supply line 11 extends through the tube 1 and terminates in the outer skin 12 of the central compartment 7 to supply sealant to the site of the joint (or leak).

A sealant return line 13 also extends through the tube 1 and into the outer skin 12 of the central compartment 7 to provide a return for excess sealant not used in the sealing process.

Each of the lines 8, 9, 10, 11 and 13 extend rearwardly through the rear end 14 of the pig and are encased in a flexible tube of mastic 15. While not shown the pressure in the feed lines 8 to 10 is controlled by a valve, suitable pressure gauges being provided.

Referring to FIG. 4, sealant is supplied to the sealant supply line 11 from a reservoir 16 containing the sealant, there being a pump 17 in the line 11 to pump the sealant to the pig. The supply line 11 also contains a valve 18 for controlling the supply pressure. Excess sealant is returned to the reservoir 16 as previously described by way of the return line 13, this also containing a valve 19 for controlling the return pressure. A pressure gauge 20 connected by way of a valve 21 to the return line 13 enables the pressure in the system to be measured for control purposes.

The system shown in FIG. 4 is necessary when the sealant is of the anaerobic type i.e. one which polymerises spontaneously in the absence of air oxygen. This type of sealant must be continously circulated to and from the site of the joint or leak to avoid its curing in the feed and return lines where, since there is little or no air or oxygen, spontaneous polymerisation would occur if the sealant were to remain stagnant for a period of time. The reservoir 16 is aerated to prevent spontaneous polymerisation of the monomer held in the reservoir 16.

A device 23 (shown in FIG. 8 and others) for locating joints and fractures is attached to the front end 22 of the pig by a suitable flexible cable-hitch arrangement 24 as shown in FIGS. 1 to 3. The device 23 may be a closed circuit television camera or an electromagnetic sensor. Cabling (not shown) may extend rearwardly through the centre of the pig to a suitable display unit e.g. a television in the case of a TV unit or a voltmeter or the like in the case of an electromagnetic sensor.

In use of the pig shown in FIGS. 1 to 4, the sensor and the pig are advanced up the main until the relevant joint or fracture is identified by sensor. The pig is then moved the appropriate predetermined further distance until its sealant supply line 11 is located opposite to the joint or fracture to be sealed. In FIGS. 1 to 3 the pig is being used to seal a joint 25 in a gas main 26 through which gas is flowing.

When the pig is opposite the joint the central compartment 7 is inflated with nitrogen so that its outer skin 12 engages with the internal wall of the gas main to expel any gas in the vicinity of the joint laterally along the wall of the main 26 and possibly also through the joint 25 itself and so that the skin 12 forms a seal with the internal wall of the main 26. Next the two end compartments 5 and 6 are inflated with nitrogen until their outer skins 27 and 28 engage and form a seal with a internal wall of the main 26. This is the situation shown in FIG. 2.

In the next step, the central compartment 7 is either partially or fully deflated by partially or fully releasing the gas pressure. The outer skin 12 then becomes detached from the wall of the main 26 and there is formed between the skin 12, the internal wall of the main 26 and the other still-inflated compartments 5 and 6, an annular substantially air and gas-free space 29 circumventing the joint 26 as shown in FIG. 3.

Sealant is then pumped along the sealant supply line to the space 29 so that it enters and fills the space 29 as soon as it is formed or as soon as possible thereafter. Some of the sealant 30 also penetrates the joint gap 25 as shown in FIG. 3. In the relatively air-free conditions now prevailing in the space 29 and joint gap 25 the sealant, if of the anaerobic type, will polymerise relatively quickly and form an air and gas-tight seal in the joint gap 25. In addition, the gas and air-free conditions will enhance bonding between the sealant and the adjacent surfaces of the main since there will be little if any gas or air to form pockets to be trapped in the sealant.

Excess sealant returns by way of the return line 13 to the reservoir 16 for further use. To ensure adequate sealing, the sealant should be pumped for several minutes.

To assist in the penetration of the joint by the sealant, the central compartment 7 can be reinflated to exert a pressure on the sealant in the space 29 to force it into the joint 26. Conditions for rapid polymerisation of the sealant, if of the anaerobic type, will be enhanced if the sealant has fully penetrated the joint gap since there will then be relatively little, if any, air in the gap.

After the joint has been sealed, the compartments 5, 6, and 7 are deflated and the pig is either withdrawn or moved to a further joint to be sealed.

Referring to FIGS. 5 to 13, the technique to be described is suitable for sealing joints in relatively short lengths of underground gas main.

In the first step of the process, (FIG. 5) an excavation 40 is dug to expose a section 41 at the end of a length of the main 42 containing the joints 43 and 44 to be sealed. Next a temporary by-pass 45 is connected between two spaced drilled apertures 46 and 47 in the exposed section 41 of the main 42. The by-pass 45 is provided with the usual manually operable shut-off valve 48 and pressure gauge 49.

Referring to FIG. 6, four further apertures 50, 51 and 52, 53 are drilled in the main 42, between the ends of the by-pass 45, the apertures being tapped and plugged, sufficient space being left between the adjacent apertures 51 and 52 to enable part of the section 41 to be removed. The plugs are removed from the apertures 50 to 53, and inflatable sealing bags 54 and 55 are inserted through the apertures 50 and 51 and a similar pair of inflatable sealing bags 56 and 57 are inserted through the apertures 52 and 53.

These bags are then inflated to obstruct the flow of gas through the section 41 and divert it through the by-pass 45, the remainder of the main 42 being otherwise isolated. With the bags 54 to 57 still in place, a portion of the section 41 lying between bags 55 and 56 is removed by cutting with a main cutter to leave the main 42 permanently isolated from the end 58 now formed (see FIG. 7). The end 58 of the main is capped off with a cap 59 and screw in plug 60 and the bags 54 and 55 are deflated and removed, the apertures 50 and 51 being plugged. To the now exposed end of the main 42 there is fitted an insertion duct 61 which forms a temporary seal at the end of the main 42. The insertion duct 61 is of a conventional type such as that described in our published UK Patent Application No. 2103753A, the duct 61 in this case incorporating merely a known-type gate valve 62. After the duct 61 has been attached to the main 42 by the known-type of Viking Johnson joint, the bags 56 and 57 are deflated and removed, the apertures 52 and 53 being plugged.

Referring to FIG. 8, the pig 63 and its joint locator 23 are first of all located in a pig trap comprising a short length of pipe. The tube incorporating the feed lines is passed through a further insertion duct 65 also similar to that described in our published UK Patent Application No. 2103753A, this duct merely incorporating a known-type gland 66 comprising two spaced annular rubber seals 67 and 68 through the centre of which passes the tube 15. The outer wall of the tube 15 and TV cabling (temporarily secured to the tube surface) are engaged by the radially inward surfaces of the seals 67 and 68 for sealing purposes. The gland 66 may be of the type including a lubricating nipple to permit lubricant to be introduced into the space between the seals 67 and 68 to lubricate the outer surface of the tube 15 for easier passage through the gland 66. Obviously to enable the tube 15 to be inserted into the gland 66, the feed lines must initially be uncoupled from the gas supply cylinder, pumps, pressure gauges and reservoir as the case may be.

Referring to FIG. 9 after the tube 15 and TV cabling or the like has been passed through the gland 66, the feed lines may be coupled to the gas cylinder etc. Once the tube 15 has been passed through the gland 66, the insertion duct 65 is connected to the pig trap 65 by conventional means e.g. a Viking Johnson joint. Similarly the pig trap 64 itself is then connected to the insertion duct 61 by any suitable means e.g. a Viking Johnson joint.

The tube 15 is relatively stiff and the pig 63 and locator 23 may be advanced up the main 42 simply by pushing the tube 15 along the main 42. The gate valve 62 must be lifted to permit the locator 23 and pig 63 to enter the main 42. Referring to FIG. 10, in practice, the locator 23 and pig 63 are first of all pushed along to that joint 69 which is most distant from the pig-trap end of the main 42. After identification, the joint is then sealed by the procedure which has already been described in the discussion of FIGS. 1 to 4. The pig is deflated and the tube 15 is then pulled back until the locator 23 identifies the next joint to be sealed (joint 44 in FIG. 10).

The pig 63 is then advanced until the sealant feed line is opposite to the joint and it is also sealed. The pig 63 is then pulled back and the next joint (43 in FIG. 10) is sealed. This procedure is repeated until all the joints have been sealed.

Referring to FIG. 11, the pig 63 and locator 23 are withdrawn by the tube 15 into the pig trap 64 after the last joint has been sealed. The gate valve 62 is then closed and the bags 56 and 57 are reintroduced into the main 42, the plugs having first been removed from the apertures 52 and 53. The bags 56 and 57 are then inflated to seal off the end of the main 42. The pig trap 64 is then removed from the end of the main 42 by uncoupling the Viking Johnson joint.

In the next step of the procedure, the gate valve 62 is removed by uncoupling its Viking Johnson joint. Once the pig trap 64 and gate valve 61 have been removed it is necessary permanently to connect the main 58 to the main 42 so that the temporary by-pass 45 may be removed. In this case the bags 54 and 55 and reintroduced into the main 58 through the apertures 50 and 51 after the plugs have been removed. The end cap 59 is then removed from the main 58 as shown in FIG. 12.

One end of a length of plastics replacement main is then inserted into the end of the main 42, an aperture is drilled in the main 42 between the bag 56 and 57 and the end of the main 42 and an expandable synthetic resin, for example, polyurethane foam is injected through the aperture and into the main 12. The foam is allowed to expand and set. The foam forms an annular seal 70 between the internal wall of the main 42 and the external wall of the replacement main 71 as shown in FIG. 13.

The free end of the replacement main 71 is connected to a closed purge valve (not shown) and the bags 56 and 57 are removed and the apertures 52 and 53 are plugged. The purge valve is opened so that gas from the main 42 can enter the replacement main 71 and purge it of any air. Next the main 71 is squeezed flat by a clamp (not shown) at a point near the purge valve end so as to stop the flow of gas to the purge valve. The valve is removed and the free end of the replacement main 71 is connected to the main 58 by means of a known-type of coupling cap 72.

Finally the clamp is removed and the bags 54 and 55 are withdrawn and the apertures 50 and 51 replugged so that gas can flow between the mains 42 and 58 by way of the replacement main 71. Further details of this procedure are contained in our published UK Patent Application No. 2103753A. Before the end of the main 71 is inserted into the main 42 an annular rubber seal may be pushed over it so as to form a further permanent annular seal 73 at the end of the main 71 between it and the inner wall of the main 42 when the seal 73 is pushed into the main 42. A typical seal is the Raychem plug seal.

Referring to FIGS. 14 to 19, the technique described is suitable for sealing joints in relatively long length underground mains. Parts identical to those described in FIGS. 5 to 13 bear the same reference numerals.

In this procedure two excavations 80 and 81 are dug at each end of the main 82 containing the joints to be sealed as shown in FIG. 14 to expose two sections 83 and 84 of the main 82. Each section is fitted with a temporary by-pass 45 identical to that previously described, apertures 46 and 47 being drilled for the purpose.

Next four further apertures 50, 51 and 52, 53 are drilled in each exposed section 83, 84 of the main 83 between the ends of the by-passes 45 as shown in FIG. 15. The apertures are tapped and plugged, there being sufficient space left between adjacent apertures 51 and 52 to enable part of each section 82, 83 to be removed. The plugs are removed from the apertures 50 to 53 and inflatable sealing bags 54 and 55 are inserted through apertures 50 and 51 and a similar pair of inflatable sealing bags 56 and 57 are inserted through the apertures 52 and 53. The bags are then inflated to obstruct gas flow through the sections 83 and 84 and divert it through the by-pass 45.

With the bags still in place, part of each of the sections 83 and 84 is removed by cutting with a main cutter to leave a central part 85 of the main 82 isolated from the two newly-formed outer ends 86, 87 of the main 82.

As shown in FIG. 16, the ends 86 and 87 of the main 82 are capped off with a cap 59 and screw in plug 60 and the bags 54, 55 in the end 86 are removed and bags 56, 57 in the end 87 are removed, the apertures 50, 51 in the end 86 and 52, 53 in the end 87 being plugged.

To the left hand end of the central portion 85 of the main 82 is first of all connected an insertion duct 88 similar to that previously described. This is connected to the main 82 by means of a Viking Johnson joint. However, the insertion duct 88 incorporates a so-called diamond gate-valve 89 rather than a lift-type gate valve as previously described. This known-type diamond valve 89 is operable to provide an opening of variable dimension, such opening being in the form of a diamond or rectangle with rubber seals forming the periphery of the opening. The valve 89 can of course be completely closed as and when required. A further insertion duct 65 similar to that previously described and including a lubricated gland 66 is then secured by a Viking Johnson joint to the duct 88.

To the right hand end of the central portion 85 of the main 82 is first of all fitted an insertion duct 90 by means of a Viking Johnson joint. The duct 90 has a tapering trumpet 91 for a purpose to be described and a gland 66 similar to that previously described.

Next a further insertion duct 88 similar to that described and incorporating diamond type gate valve 89 is connected to the duct 90 also by means of a Viking Johnson joint.

Referring to FIG. 17, a winch 92 is disposed above ground 93 adjacent to the end 87 of the main 82. A stiff rod 94 is inserted through the left hand end of the main 82 through the gland 65 which forms a gas tight seal with the rod 94. The diamond valve 89 which was closed is now opened sufficiently to permit entry of the rod 94 to the main 85. The valve 89 is then closed so that its sealing surfaces engage the rod surface to form a further seal with the rod 94.

The rod 94 is then pushed through the main 85 and enters the wider end of the trumpet 91 which serves as a guide to guide the rod towards the gland 66 and the diamond valve 89. It will be appreciated of course that the valve 89 in the duct 90 is closed until the rod 94 engages it. The gland 66 forms a gas tight seal with the rod 94 and then the valve 89 is opened and the rod 94 is pushed through it following which the valve 89 is closed down on the rod 94 to form a further seal with the rod 94.

The rod 94 is finally pushed out of the main 85. As shown in FIG. 17, the rod 94 has at its leading end an eye 95 to which the cable 96 of the winch 92 is attached. After the cable 96 has been attached to the rod 94, the rod 94 is pulled back through the main 94, to pull with it the winch cable 96. As the cable 96 enters each of the diamond valves 89, these are closed down on it so as to make a seal with the cable 96 and prevent gas escaping from the main 85.

Referring to FIG. 18, when the cable 96 has been withdrawn through the left hand end of the main 85, it is disconnected from the rod 94 and the duct 65 is removed from the left hand end of the main 85 over the cable 96. The cable 96 is then connected to the front end of the joint locator 23 which is disposed with the pig 63 within the pig trap 64.

An insertion duct 65 is attached to the rear end of the pig trap 64 and the pig trap 64 is secured by means of a Viking Johnson joint to the left hand end of the main 85. As described with reference to FIGS. 8 and 9 the pig tube 15 housing the feed lines extends sealingly back through the gland 66 in the duct 65.

The joint locator 23 and pig 63 are then towed by the cable 96 from the left hand end of the main 85 to that joint nearest to the right hand end of the main 82. It will be necessary to fully open the diamond valve 89 at the left hand end of the main 85 to permit the passage of the locator 23 and pig 63 therethrough. This valve can be closed down on the tube 15 when the locator 23 and pig 63 have passed through.

The joints are then sequentially sealed in turn as previously described. The locator 23 and pig 63 are pulled back to the left hand end of the main 85 by tugging on the tube 15. After each joint has been located, the pig is winched forward to the joint to be sealed.

This procedure is followed until the last joint has been sealed. This joint will be nearest to the left hand end of the main 85.

Referring to FIG. 19, when the pig and locator reach the diamond valve 89 at the left hand end of the main 85, the valve 89 is fully open to permit withdrawal of the pig and locator. Immediately the pig and locator have passed through the valve 89, it is closed down to form a seal with the cable 96.

The pig trap 64, into which the locator and pig are eventually pulled, is then removed from the left hand end of the main 85 and the cable 96 is detached from the locator 23.

Next, the cable 96 is winched back through and out of the main 85, the diamond valves 89 being closed immediately the cable 90 has passed through them.

In the next stage the main 85 is once again bagged off at both its ends and the ducts are all removed. Then two lengths of replacement main (not shown) are connected between the main 86 and the main 85 and the main 87 and the main 85 using the technique already described with reference to FIGS. 12 and 13. The excavations may then be back-filled as usual.

The joint locator 23 is designed to slide on skids or the like, there being gaps between the central body of the locator 23 and the skids to let gas pass through. Gas can also pass through the hollow centre of the pig 63. Therefore the sealing of joints can take place in "live" conditions i.e. with gas flowing along the main at all times.

The term "joint" used in this specification includes not only those joints which are actually leaking but in fact any joint whether or not it is leaking. Sealing non-leaking joints will serve as a preventative measure.

The term "leak" includes all types of leak caused by fractures and fissures in the wall of the pipe line or main.

We claim:

1. Apparatus for sealing a joint or leak in a fluid-transporting pipeline or main, the apparatus comprising a tubular pig which is movable endwise through the pipeline or main, the pig being hollow to permit fluid to flow therethrough and having an inflatable surface adapted to form with an internal wall of the pipeline or main space which is substantially free of the fluid and which communicates with the joint or leak, an outlet in the surface of the pig, an inlet in the surface of the pig, a reservoir for containing sealant to be supplied to the space to seal the joint or leak, a feed line connecting the reservoir to the outlet in the surface of the pig to feed sealant to the space so formed, a return line connecting the reservoir to the inlet in the surface of the pig to return unused sealant from the space so formed to the reservoir, and means for circulating the sealant between the reservoir and the space by way of the feed and return lines.

2. Apparatus as claimed in claim 1 in which the pig includes a hollow tubular body and the pig surface comprises a flexible sleeve secured to the tubular body in such a way as to form with the body of the pig three axially adjoining inflatable compartments, a central one of the compartments being, in use, located opposite the joint or leak to be sealed, and being inflatable independently of both adjoining end compartments and that portion of the sleeve forming the central compartment including the sealant inlet and outlet.

* * * * *